(12) United States Patent
Seyfer

(10) Patent No.: US 6,578,267 B2
(45) Date of Patent: Jun. 17, 2003

(54) AIR TOOL FOR SECTIONING A LENGTH OF TUBING

(76) Inventor: Donald L. Seyfer, 4501 Harlan St., Wheat Ridge, CO (US) 80033

( * ) Notice: Subject to any disclaimer, the term of this patent is extended or adjusted under 35 U.S.C. 154(b) by 0 days.

(21) Appl. No.: 10/093,593

(22) Filed: Mar. 7, 2002

(65) Prior Publication Data
US 2002/0088326 A1 Jul. 11, 2002

Related U.S. Application Data

(62) Division of application No. 09/277,291, filed on Mar. 26, 1999, now abandoned.
(60) Provisional application No. 60/104,911, filed on Oct. 20, 1998.

(51) Int. Cl.[7] .............................. B26D 7/02; B23D 21/06; B26B 27/00
(52) U.S. Cl. ................................ 30/93; 30/92; 30/124; 30/378; 30/276; 30/289
(58) Field of Search .............................. 30/92, 93, 102, 30/124, 371, 378, 388, 276, 278, 289, 290, 90.3, 91.2, 96, 97, 144, 286; 83/456, 422, 433, 431, 436.45, 436.8, 733, 439, 443, 564, 824, 825

(56) References Cited

U.S. PATENT DOCUMENTS

| | | | | |
|---|---|---|---|---|
| 1,204,345 A | * | 11/1916 | Davey et al. | 30/276 |
| 2,007,122 A | * | 7/1935 | Briegel | 30/102 |
| 2,992,482 A | * | 7/1961 | Smith | 30/276 |
| 3,115,910 A | * | 12/1963 | Steiner | 144/136.1 |
| 3,805,383 A | * | 4/1974 | McNally | 30/378 |
| 4,422,239 A | * | 12/1983 | Maier et al. | 30/124 |
| 4,864,730 A | * | 9/1989 | Weiss | 30/124 |
| 5,582,041 A | * | 12/1996 | Spiess | 30/276 |

* cited by examiner

Primary Examiner—Boyer D. Ashley
(74) Attorney, Agent, or Firm—Scott L. Terrell, P.C.; Scott L. Terrell

(57) ABSTRACT

A portable, hand held exhaust pipe cutter having an air motor to drive a cutting wheel arranged parallel to a drive shaft of the air motor by an angle head gearing device. The cutter makes straight cross-sectional cuts through cylinders by using a feed lever pivotally attached to the air motor that engages the cylinders to be cut and guides them into engagement with the cutting wheel. The feed lever on an opposing end includes a handle that extends along the air motor so that a user can grip both the control lever of the air motor and the handle of the feed lever simultaneously with a single hand.

7 Claims, 4 Drawing Sheets

AIR TOOL FOR SECTIONING A LENGTH OF TUBING

CROSS REFERENCE TO RELATED APPLICATIONS

This application is division and claims the benefit under 35 U.S.C. 121 of the 35 U.S.C. 111(a) application Ser. No. 09/277,291, filed Mar. 26, 1999, now abandoned, which in turn claims the benefit to the 35 U.S.C. 111(b), provisional application 60/104,911, filed Oct. 20, 1998.

BACKGROUND OF THE INVENTION

1. Field of the Invention

This invention relates to air tools. More particularly, it relates to an anglehead air tool which is useful in the removal of worn exhaust system components, such as steel tubing of various sizes, from the underside of a vehicle.

2. Description of the Related Art

The standard procedure for exhaust system installers has been to remove the rusted and worn exhaust system components from the underneath of a motor vehicle with an oxygen-acetylene cutting torch. The most serious problem associated with the use of a cutting touch involves the fire hazard when locating high intensity heat to combustible products, frequently found in close proximity to desired location of the cut. In addition, when using an oxygen-acetylene torch, it is particularly difficult to make an accurate and clean cut, about the circumference of the tube. An accurate and clean cut is desirable in order to eliminate any further preparation, of the newly cut surface, for subsequent installation of replacement components. Accordingly, the prior art has focused on the development of a cutting tool which safely produces a clean and smooth cut, about the circumference of the tube.

In U.S. Pat. Nos. 3,805,383, and 3,834,019, a portable reciprocating type saw attachment is disclosed having a saw body and a sabre blade receiving bracket. The blade receiving bracket is clamped to the blade-end of the body, by means of a spring. The blade receiving bracket provides a lower tube receiving recess, having a right angle shape, for locating the exhaust system tubing against the reciprocating blade. The blade receiving recess is pivotally mounted for movement between an open, tubing receiving position, and a closed position, upon completion of the cutting cycle. Movement, by the operator, between the open and closed positions is accomplished by pressing, in a direction away from the saw body, on a lever to cause the tubing to close against the saw blade.

It is believed, however, that certain disadvantages are inherent in the sabre saw and attachment design which must be overcome to provide an improved device. Initially, spring mounting of the tube receiving attachment to the saw body, may not rigidly clamp an exhaust tube in relation to the saw and blade, when used in the awkward and confined work space which is typically encountered during motor vehicle repair. Metal sabre saw blades are also easily broken when used at various angles, in tight locations. Moreover, a sabre saw is a large tool, and is not easily accessible to a wide variety of cutting locations. It is also heavy and would normally require the operator to use both hands to hold the tool. Thus, an operator would require assistance in holding a work piece. There is a need, therefore, for a durable high speed, hand-held, exhaust cutting tool characterized by ease in operation, and which provides a smooth even cut of the exhaust system components, when used in tight work spaces.

Accordingly, it is an object of the present invention to provide an air device for cleanly and efficiently cutting a tube.

It is another object of the invention to provide an improved cutting device for removing the worn exhaust system components, of various diameter sizes within a predetermined range, from a motor vehicle.

It is another object of the present invention to provide a hand-held, high speed cut-off tool which is useful for working in tight areas.

It is yet another object of the present invention to provide a cut-off tool, for removing the worn exhaust components from a motor vehicle, which results in an accurate and smooth tube section, about the circumference, in order to eliminate further surface preparation of the cut surface, prior to the installation of standardized replacement parts.

SUMMARY

The present invention provides an air tool for removing worn exhaust components from a motor vehicle. In combination with an air tool having an air motor, an air motor body, an angle head drive means connected to the air motor and body, and a cutting wheel and axle assembly connected to the drive means, the improvement for making a straight cross-sectional cut through a cylinder which comprises a feed lever, having a pivot point, a first end extending above the cutting wheel, and a second end extending below the air motor body as a handle for applying a pressure while the air tool is in use, the feed lever being pivotally mounted on the housing at the pivot point such that the first end guides the wheel in making the straight cross-sectional cut when a pressure is applied to the second end by hand.

Unless specifically defined otherwise, all technical or scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

DESCRIPTION OF THE PREFERRED EMBODIMENTS

The present invention provides an air tool for removing worn exhaust components from a motor vehicle. The saw is characterized by high speed, light weight, and small size, for easy insertion into the tight work areas often associated with the underneath of a vehicle, to be repaired. The air tool is operable with one hand, by means of a tube engaging feed lever, having a scissors like action with respect to the wheel, for accurately and cleanly cutting through exhaust system components.

In a basic configuration, the air tool comprises an air motor, an air motor housing and an angle head drive. A bearing sleeve is located within the housing through which a drive shaft, driven by the air motor, extends from the air motor into an anglehead drive body. The anglehead drive body is in rigid connection with the air motor housing. Within the anglehead drive body, is an angle drive means to translate the rotational axis of a cut-off wheel perpendicular to that of the motor. The cut-off wheel is supported on an axle in perpendicular rotational engagement to the drive shaft. The axle extends outwardly from the anglehead drive body through a sleeve and a seal. The cut-off wheel is rigidly connected to the axle, for easy removal, by a fastener such as a nut, bolt, screw, or clip.

To provide for a smooth and even cut, about the circumference of the tube, the cut-off tool is provided with a feed lever which is operated by hand in a scissors like manner with respect to the wheel. This lever is used to hold the uncut portion of the tube firmly against the wheel throughout a cutting cycle. The feed lever has a first portion, a middle portion and a second portion. The middle portion is in pivotal connection with at least one side of the air motor body, in a plane substantially parallel to the plane of the cut-off wheel. The first portion extends in a spaced relationship over the wheel. The second portion extends below the motor body, and is used as a handle, for resiliently biasing the first portion, of the feed lever, against the tube. At least two roller assemblies are provided. The roller assemblies are attached, transversely, to the first portion, of the feed lever. In this manner, the entire device is easily rotated about the section of tube, to be cut, to assist in a clean cut, and in easily locating the cut when working in tight spaces.

Figure 1:
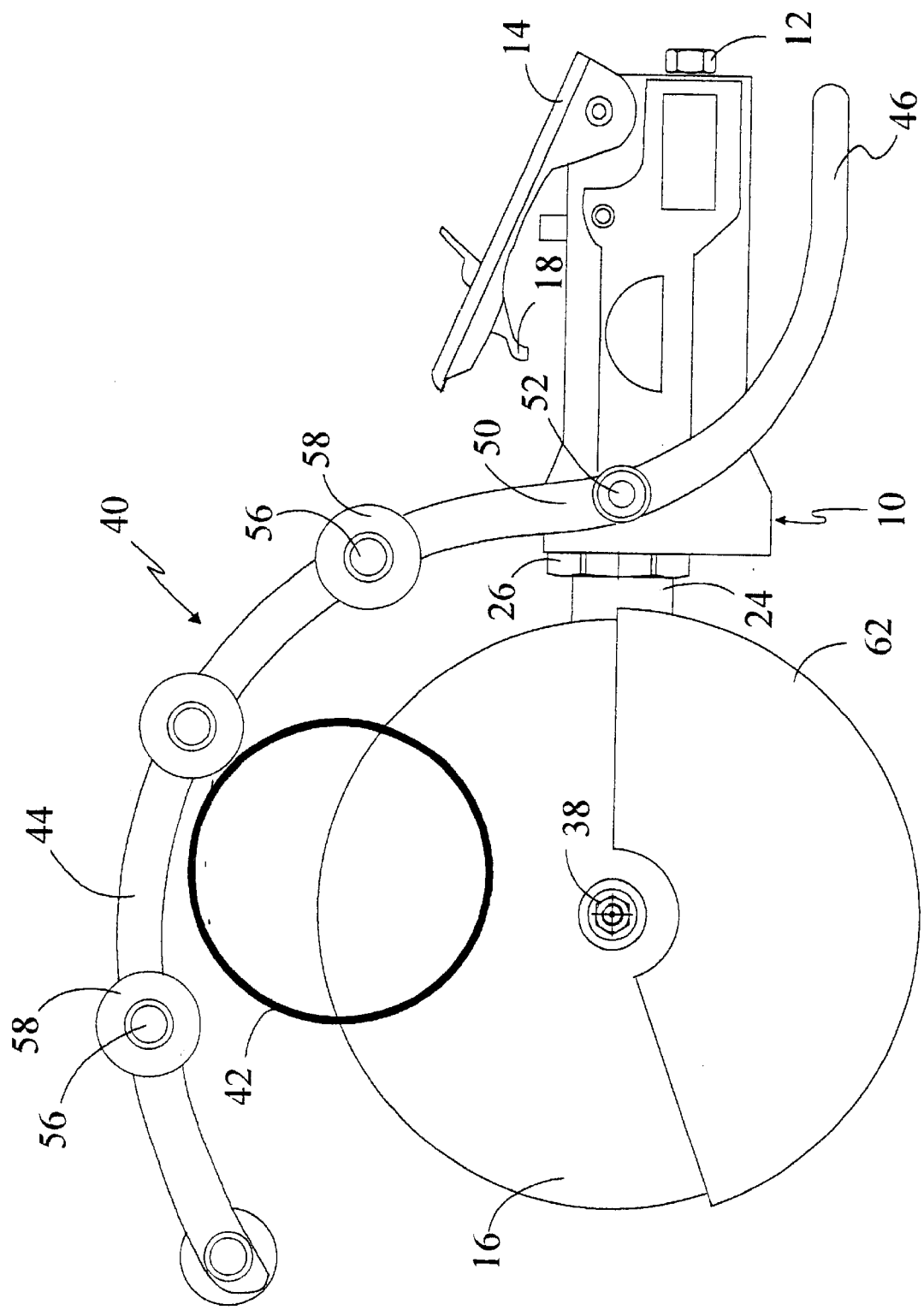
FIG. 1, is a side plan view of the air tool saw.
Figure 2:
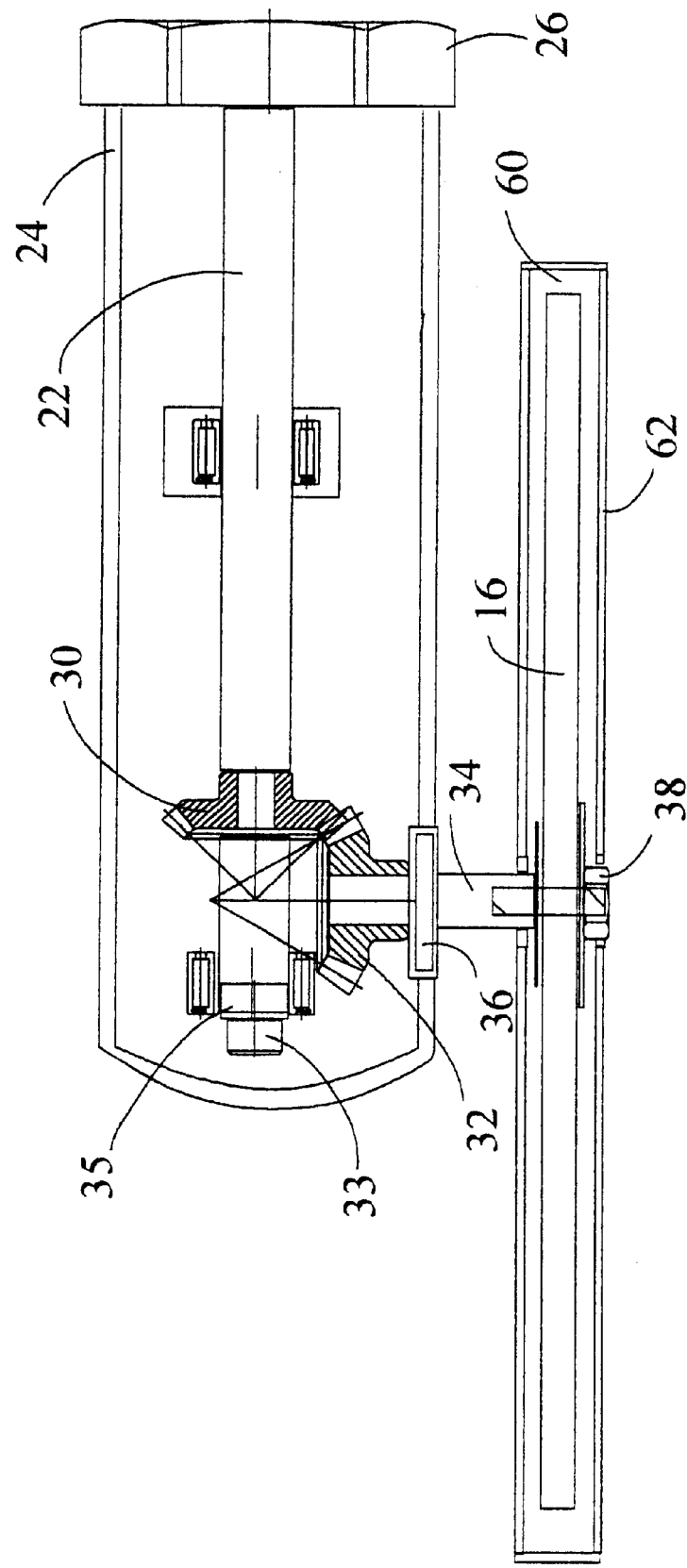
FIG. 2, is top elevation view of the air tool saw with a cut-away of the anglehead body.
Figure 3:
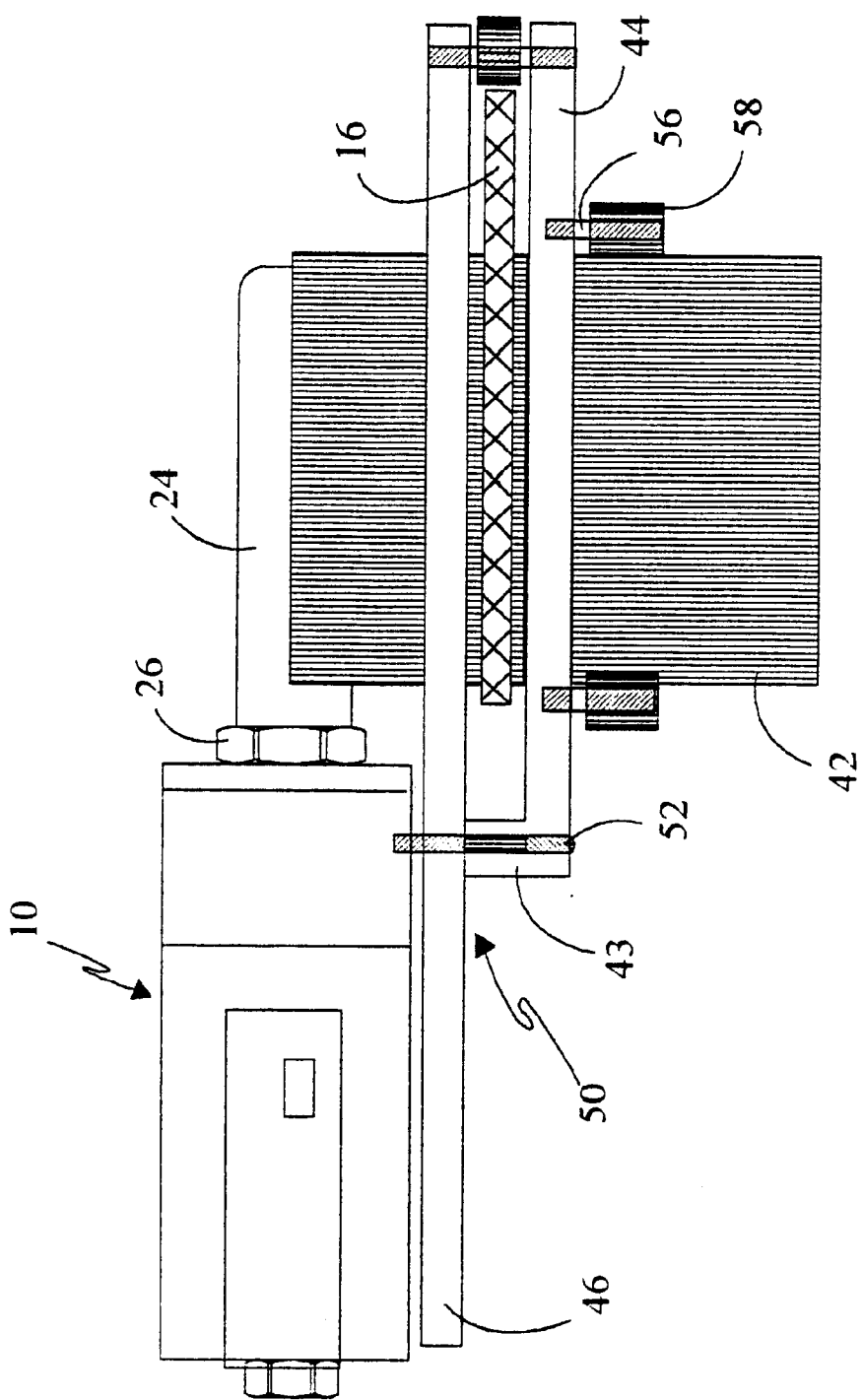
FIG. 3, is a top elevation view of the air tool saw.

Referring now to the drawings, wherein like numerals represent like elements, there is shown generally therein at 10, in FIG. 1, an air motor of a construction which is well known in the art such as the air motor tool manufactured by MAC Tool Company, Model No. ADG410AH. Air motor 10 includes an air chuck 12 which connects to a compressed air supply used to drive the motor preferably at an average air consumption of approximately 3 cfm. An air control lever 14 is used to control the motor 10 speed. The motor 10 speed preferably translates to a desired cut-off wheel 16 speed of between 6,000 and 20,000 rpm. Air control lever 14, includes an air control safety 18. Drive shaft 22, in FIGS. 2 and 3, is driven at one end by the air motor and is located through a bearing sleeve (not shown) within the air motor housing for outward extension into a sealed anglehead drive unit 24. The anglehead drive unit 24 is connected to motor body 10 by an assembly means 26, such as a large nut on threads in the motor body 10.

Figure 4:
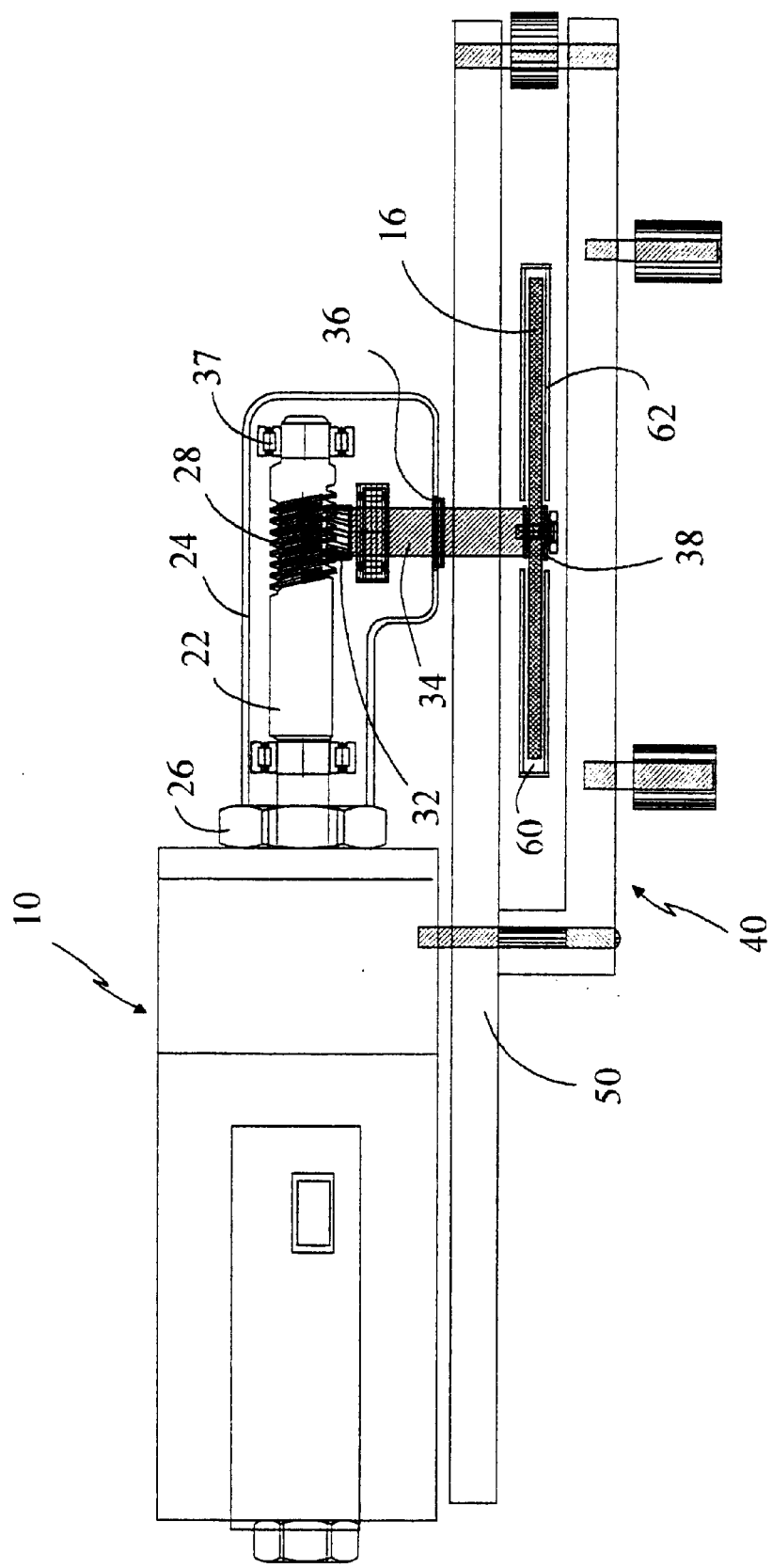
FIG. 4, is second top elevation view of the air tool with a cut-away of the anglehead body to illustrate another embodiment of the drive means.

With reference now to FIGS. 2 and 4, located within anglehead drive unit 24, is a convention drive system, such as a combination of spiral 28 (FIG. 4), or bevel gears 30 (FIG. 2), at shaft end 22, for translation of the rotation of the cutting wheel 16, perpendicular to that of the rotational axis of the air motor 10. The drive system is made such that the combination of the air motor rotational speed, gear ratios, and cut-off wheel diameter translate to a desired cut-off wheel 16 speed of between 6,000 and 20,000 rpm. In a preferred embodiment, shaft 22 end 33 is rotationally supported by a sleeve and bearings, such as roller bearings 37. An axle 34 is connected at one end to a second conventional drive, such as gear 32, and extends outwardly, through a seal and bearing assembly 36, through the anglehead drive body 24. The seal and bearing assembly 36 prevents leakage of lubricant within drive body 24. The cut-off wheel 16 is rigidly fastened, by means of a nut, bolt or screw 38, to axle 34 for removable replacement of the wheel 16. Cut-off wheel 16 is desirably between 12.7 and 17.78 centimeters in diameter and has an abrasive carbide cutting material on the surface.

It is important, in the removal of worn exhaust system components, to ensure a clean-cut and it is desirable to have one hand free in the operation of the cutting device. These operations are provided by means of a tube engaging feed lever 40, shown generally in FIGS. 1 and 4. The feed lever 40 is desirable made of forged steel but may be cast of metal or molded of high impact plastic. Feed lever 40 is hand operated by squeezing portion 46 against motor body 10 in a scissors like action with respect to the cut-off wheel 16. The feed lever 40 is thereby used to engage tube 42 (FIG. 3) against cut-off wheel 16, throughout completion of a cutting cycle. In this manner, feed lever 40 facilitates a precision 90° cross-sectional cut through the tube 42, thereby minimizing the amount of preparation, of the resulting cut, prior to the replacement of commonly used exhaust system replacement parts.

Tube engaging feed lever 40 has a first portion, shown generally as 44, a middle portion 50, and a second portion 46, which serves as a handle. Feed lever 40 is in lateral pivotal connection, at 43 of middle portion 50, with at least one side of the air motor body 10, in a plane substantially parallel to the plane of the cut-off wheel 16, by means of pivot pin 52, threaded into the motor body 10, and secured by a retaining ring, pin, nut, or screw (not shown). First portion 44, of the feed lever 40, extends in a spaced relationship over the cut-off wheel 16. Second portion 46 is useful, as a handle, for resiliently biasing first portion 44, of the feed lever 40, against tube 42, in a scissors like action, with respect to the cut-off wheel 16. In a preferred embodiment, at least two roller assemblies comprising a cast or welded pin, or a screw, axle 56, and a roller 58, are connected to the first portion 44 of feed lever 40 to assist in rotating the wheel 16 around the tubing throughout the completion of the cutting cycle. In this manner, the operator may either simultaneously rotate the cut-off tool about the circumference of the section of tubing, to be cut, at a cutting depth equal to the thickness of the tubing wall or may cut cleanly and completely through the entire diameter of the exhaust system tube.

With reference now to FIG. 4, a top elevation view of the invention is generally shown with the upper surface of the anglehead body removed, for illustration of one embodiment of the drive means. Here, spiral gear 28 is shown in connection with drive shaft 22. In perpendicular rotational engagement with spiral gear 28 is bevel gear 32 and axle 34. Axle 34 extends through sleeve and bearing assembly 36, in anglehead body 24, and fastens to cut-off wheel 16. Cut-off wheel 16 is disposed for free rotation within a safety guard recess 60, of safety guard 62. Guard 62 is firmly connected (not shown), to either the axle or anglehead body by a weld, or fastener such as a nut, bolt, or screw, located for tensioned travel within a slot in a guard mounting for positional adjustment of the guard, with respect to the wheel. In FIG. 1, guard 62 is shown of a design which allows for a maximum opening for receiving tube 42. Guard 62 maybe rotated in a clockwise or counter clockwise direction in relation to the wheel in order to close the spaced relationship between feed lever 40 and guard 62 by loosening the fastener and sliding the fastener within the slot of the guard attachment bracket. In this manner the operator may direct the spray of sparks in a desired direction during the cutting cycle.

With reference now to FIG. 4, it is shown generally therein an alternative embodiment of the perpendicular drive arrangement within a top elevation cutaway view of the anglehead body 24. Here, bevel gear 32 is provided near shaft 22 end in alternative to the spiral gear 28 of FIG. 4. The end of shaft 22 is preferably stabilized with a bearing and sleeve 35.

The foregoing description is considered as illustrative only of the principles of the invention. Furthermore, since numerous modifications and changes will readily occur to those skilled in the art, it is not desired to limit the invention to the exact construction as described above. Accordingly, all suitable modifications and equivalents may be resorted to falling within the scope of the invention as defined by the claims which follow.

I claim:

1. A portable, hand held exhaust pipe cutting device for cutting straight cross-sectional cuts through cylinders of various sizes, comprising:

an elongated air motor body having an air motor enclosed by said body which is operably connected to an air source and an air control lever pivotally attached to said air motor body and extending along and substantially parallel to the elongated air motor body; said air motor including a drive shaft extending from said air motor body and substantially parallel to said air control lever; said air motor is operably connected to one end of said drive shaft for rotating said shaft upon actuating said air motor by pivoting said control lever towards the air motor body;

a cutting wheel and guard, said guard coving an upper half of said wheel;

an angle head drive means connected to said drive shaft and to said cutting wheel by two perpendicularly arranged and engaged gears such that rotational motion of said drive shaft is transferred to said cutting wheel; said angle head drive means allowing said cutting wheel to be oriented in a cutting plane that is parallel to the elongated air motor body and the drive shaft; and a feed lever having a pivot point, a pipe guiding end extending above the cutting wheel, and a handle end extending below and along the elongated air motor body; said pivot point of said feed lever between said ends and pivotally mounts the feed lever to the elongated air motor body such that movement of the handle end of the feed lever towards the air motor body moves the pipe guiding end towards a lower half of the cutting wheel; said pipe engaging end is curved relative to and in matching relationship to the lower half of the cutting wheel such that it surrounds the lower half of the cutting wheel for providing a pipe engaging surface that guides various sized pipes into cutting engagement with the cutting wheel; said air control lever and said handle end of said feed lever extending substantially parallel to each other and on opposite sides of the air motor body such that a user grips both the air control lever of the air motor body and the handle end of the feed lever at the same time with one hand thereby enabling the user to actuate the air motor and the feed lever at the same time with one hand, wherein actuation of the air motor and the feed lever moves pipes through the cutting wheel.

2. The air tool of claim 1, wherein the pipe guiding end further comprises a gap clearance for permitting the wheel to pass while making the cross-sectional cut.

3. The air tool of claim 2, wherein the pipe guiding end further comprises a plurality of rollers adopted for guiding the wheel about outer walls of the pipes to be cut.

4. The air tool of claim 3, further comprising said guard connected to the air motor body, the guard having a recess adapted to receive a circumferential edge of the cutting wheel.

5. The air tool of claim 4, wherein the wheel is 12.7 to 17.78 centimeters in diameter.

6. The air tool of claim 5, wherein the wheel rotates at a free speed of between 6,000 and 20,000 revolutions per minute.

7. The air tool of claim 6, wherein the wheel is comprised of carbide.

* * * * *